(12) United States Patent
Conde

(10) Patent No.: US 9,630,524 B1
(45) Date of Patent: Apr. 25, 2017

(54) ELECTRIC VEHICLE

(71) Applicant: Kandas Conde, Staten Island, NY (US)

(72) Inventor: Kandas Conde, Staten Island, NY (US)

( * ) Notice: Subject to any disclaimer, the term of this patent is extended or adjusted under 35 U.S.C. 154(b) by 0 days.

(21) Appl. No.: 15/261,256

(22) Filed: Sep. 9, 2016

Related U.S. Application Data

(63) Continuation-in-part of application No. 14/459,686, filed on Aug. 14, 2014, now abandoned.

(51) Int. Cl.
| | | |
|---|---|---|
| *H02P 1/54* | (2006.01) |
| *B60L 15/20* | (2006.01) |
| *B60L 11/18* | (2006.01) |
| *H02K 7/00* | (2006.01) |
| *H02K 11/00* | (2016.01) |
| *B60K 1/02* | (2006.01) |
| *B60K 17/04* | (2006.01) |
| *B60K 26/02* | (2006.01) |

(52) U.S. Cl.
CPC ............. *B60L 15/20* (2013.01); *B60K 1/02* (2013.01); *B60K 17/04* (2013.01); *B60K 26/02* (2013.01); *B60L 11/18* (2013.01); *H02K 7/003* (2013.01); *H02K 11/0094* (2013.01); *B60L 2250/26* (2013.01)

(58) Field of Classification Search
CPC ......... B60W 10/04; B60W 10/08; B60K 6/10; B60K 6/105; B60K 2006/262; B60K 6/28; B60K 6/40

USPC .................................. 318/45, 51, 55, 59, 66
See application file for complete search history.

(56) References Cited

U.S. PATENT DOCUMENTS

| | | | |
|---|---|---|---|
| 5,415,606 A * | 5/1995 | Kovalsky .............. | F16H 61/061 477/148 |
| 5,704,440 A | 1/1998 | Urban et al. | |
| 5,856,709 A | 1/1999 | Ibaraki | |
| 6,373,206 B1 | 4/2002 | Morimoto | |
| 6,402,659 B1 * | 6/2002 | Inoue .................... | F16D 48/066 477/39 |
| 6,537,175 B1 | 3/2003 | Blood | |
| 6,554,088 B2 | 4/2003 | Severinsky et al. | |
| 6,729,990 B1 | 5/2004 | Haupt | |
| 7,571,967 B2 | 8/2009 | Saito et al. | |
| 2004/0147353 A1 * | 7/2004 | Bowen .................. | B60K 6/365 475/5 |
| 2007/0227509 A1 * | 10/2007 | Ueda ...................... | F01L 1/022 123/509 |
| 2010/0044129 A1 | 2/2010 | Kyle | |
| 2013/0066492 A1 | 3/2013 | Holmes et al. | |
| 2013/0253787 A1 | 9/2013 | Hou | |

* cited by examiner

*Primary Examiner* — Rina Duda

(57) ABSTRACT

An electric vehicle system featuring a novel idling capability is presented. The vehicle performs without electricity from an external power source resulting in decreased entropy generation. It also asserts a zero carbon footprint while excluding typical emissions produced by conventional all-electric vehicles. This novel invention has a capacity between idle speed (1000 rpm) and high speed (6000 rpm) using a constant electric current.

2 Claims, 5 Drawing Sheets

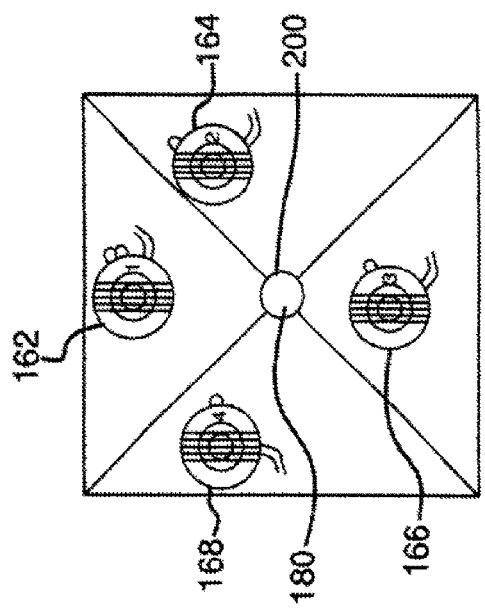
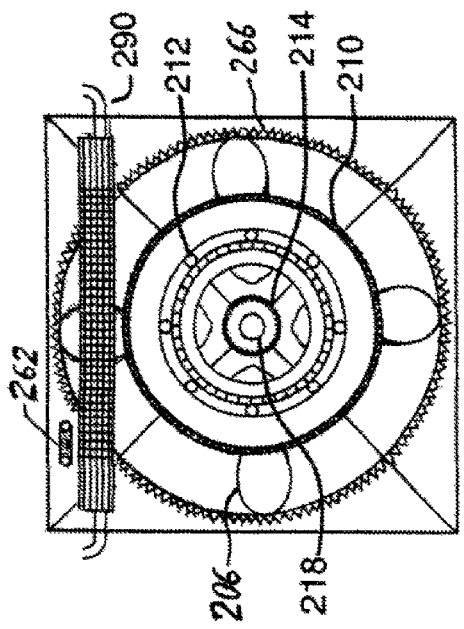
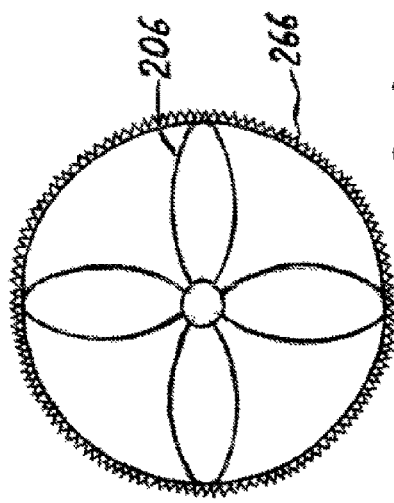
FIG. 2
FIG. 3
FIG. 4

ELECTRIC VEHICLE

CROSS REFERENCE

This application is a continuation-in-part and claims benefit of U.S. patent application Ser. No. 14/459,686 filed Aug. 14, 2014, the specification(s) of which is/are incorporated herein in their entirety by reference.

FIELD OF THE INVENTION

The present invention relates to electric vehicles and electric vehicle systems.

BACKGROUND OF THE INVENTION

The vehicle of the present invention features a combination of systems for an electric vehicle that performs without electricity from an external power source resulting in decreased entropy generation. The vehicle has a zero carbon footprint and emits none of the typical emissions produced by conventional all-electric vehicles. A hybrid vehicle, however has a carbon footprint and generates emissions depending on the fuel and technology used. Also, unlike a plug-in electric vehicle or hybrid, this electric vehicle system has an automatic transmission clutch adapter system that disconnects the automatic transmission from the engine system to prevent energy loss during braking.

The present system has a demonstrated capacity between idle speed (1000 rpm) and high speed (6000+ rpm) to produce an exponentially high electric power. This high electric power maintains a consistently high battery power and also provides feedback for the electric system.

This novel electric vehicle is the only electric vehicle that combines a brake pedal system and a clutch pedal system into a single pedal to perform at the same time in any case or combination, e.g., electric brake and electric clutch system, hydraulic brake and hydraulic clutch system, hydraulic brake and electric clutch system or electric brake and hydraulic clutch system.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features an electric engine system of an all-electric vehicle having an idling capability. In a preferred embodiment, the system may comprise a first electric motor, a second electric motor, a third electric motor and a fourth electric motor. A first motor sprocket is operatively connected to the first electric motor, a second motor sprocket is operatively connected to the second electric motor, a third motor sprocket is operatively connected to the third electric motor, and a fourth motor sprocket is operatively connected to the fourth electric motor.

Further, a first shaft sprocket, a second shaft sprocket, a third shaft sprocket, and a fourth shaft sprocket are axially disposed on a main system shaft. Rotation of the main system shaft is accomplished by the plurality of sprockets wherein the first motor sprocket operatively connects to the first shaft sprocket via a first loop belt, the second motor sprocket operatively connects to the second shaft sprocket via a second loop belt, the third motor sprocket operatively connects to the third shaft sprocket via a third loop belt, and the fourth motor sprocket operatively connects to the fourth shaft sprocket via a fourth loop belt.

Adjustment of the speed of the main system shaft is controlled by the relative ray sizes of the motor sprockets and shaft sprockets. For example, the ray size of the first motor sprocket is smaller than the ray size of the second motor sprocket where the ray size of the second motor sprocket is smaller than the ray size of the third motor sprocket where the ray size of the third motor sprocket is smaller than the ray size of the fourth motor sprocket. Similarly, the ray size of the first shaft sprocket is bigger than the ray size of the second shaft sprocket, where the ray size of the second shaft sprocket is bigger than the ray size of the third shaft sprocket, where the ray size of the third shaft sprocket is bigger than the ray size of the fourth shaft sprocket.

Activation of the motors must occur in a determined fashion. For example, a single solenoid may be coupled to a single motor to control the opening and closing of the motor circuit. Specifically, a first solenoid operatively connects to the first electric motor, a second solenoid operatively connects to the second electric motor, a third solenoid operatively connects to the third electric motor, and a fourth solenoid operatively connects to the fourth electric motor.

In a further embodiment, an accelerator pedal is operatively connected to an accelerator pedal cable, wherein the accelerator pedal comprises four depression depths. A first depression depth is reached when zero force is applied against the accelerator pedal, a second depression depth is reached when a first force is applied against the accelerator pedal, a third depression depth is reached when a second force is applied against the accelerator pedal, and a fourth depression depth is reached when a third force is applied against the accelerator pedal. The magnitudes of the plurality of applied forces should differ. For example, the initial force is zero Newton, the first force is larger than zero Newton, the second force is larger than the first force, and the third force is larger than the second force.

The system may further comprise, an accelerator command box housing an accelerator command box lever (operatively connected to the accelerator pedal via the accelerator pedal cable), a first accelerator command box contact plate, a second accelerator command box contact plate, a third accelerator command box contact plate, and a fourth accelerator command box contact plate. The first accelerator command box contact plate is operatively connected to the first solenoid, the second accelerator command box contact plate is operatively connected to the second solenoid, the third accelerator command box contact plate is operatively connected to the third solenoid, and the fourth accelerator command box contact plate is operatively connected to the fourth solenoid.

In accordance with disclosed embodiments, upon activation of the system switch key to a first position, the electric motor switch is activated moving the inverter switch box contact disc to an ON position. The inverter switch box electric motor ON positioning sensor is activated thus deactivating (turning OFF) the electric motor switch while the inverter remains ON and provides electric power to the electric motor system. Upon activation of the system switch key to a second position and the accelerator command box lever in idling position, the first solenoid closes the circuit of the first electric motor causing the first electric motor to operate at maximum speed. The first electric motor drives the first motor sprocket and the first shaft sprocket, where the first motor sprocket and the first shaft sprocket operate to rotate the main system shaft at an idle speed.

Further, when the first force is applied to the accelerator pedal. Namely, a proportional force is applied to the accelerator pedal cable, moving the accelerator command box lever from the first accelerator command box contact plate to the second accelerator command box contact plate. This causes the first solenoid to open the circuit of the first electric motor, thereby shutting it off, and activating the second solenoid to close the circuit of the second electric motor (causing the second electric motor to run at maximum speed). The second electric motor drives the second motor sprocket and the second shaft sprocket. These sprockets operate to rotate the main system shaft at a second speed, where the magnitude of the second speed level is greater than the magnitude of the idle speed.

When the second force is applied to the accelerator pedal, a proportional force is applied to the accelerator pedal cable, which causes the accelerator command box lever to move from the second accelerator command box contact plate to the third accelerator command box contact plate. The second solenoid then opens the circuit of the second electric motor, shutting it off, and the third solenoid closes the circuit of the third electric motor. Once the circuit is closed, the third electric motor is able to run at maximum speed. The third electric motor drives the third motor sprocket and the third shaft sprocket and these sprockets operate to rotate the system shaft at a third speed level (at a magnitude greater than the second speed level).

Finally, at the application of the third force to the accelerator pedal, a proportional force is applied to the accelerator pedal cable. This moves the accelerator command box lever from the third accelerator command box contact plate to the fourth accelerator command box contact plate, activating the third solenoid to open the circuit of the third electric motor, thereby shutting it off. The fourth solenoid is activated to close the circuit of the fourth electric motor, causing it to run at maximum speed. The fourth electric motor drives the fourth motor sprocket and the fourth shaft sprocket, where the fourth motor sprocket and the fourth shaft sprocket operate to rotate the main system shaft at a fourth speed. The magnitude of the fourth speed level is greater than the magnitude of the third speed level.

BRIEF DESCRIPTION OF THE DRAWINGS

FIG. 2 shows a rear view of the electric motor system with the pressure plate, the fan-gear and the heat collector of the present invention.
FIG. 3 shows a front view of the electric motor system of the present invention.
FIG. 4 shows perspective view of the system fan-gear of the present invention.

DESCRIPTION OF PREFERRED EMBODIMENTS

Figure 1:
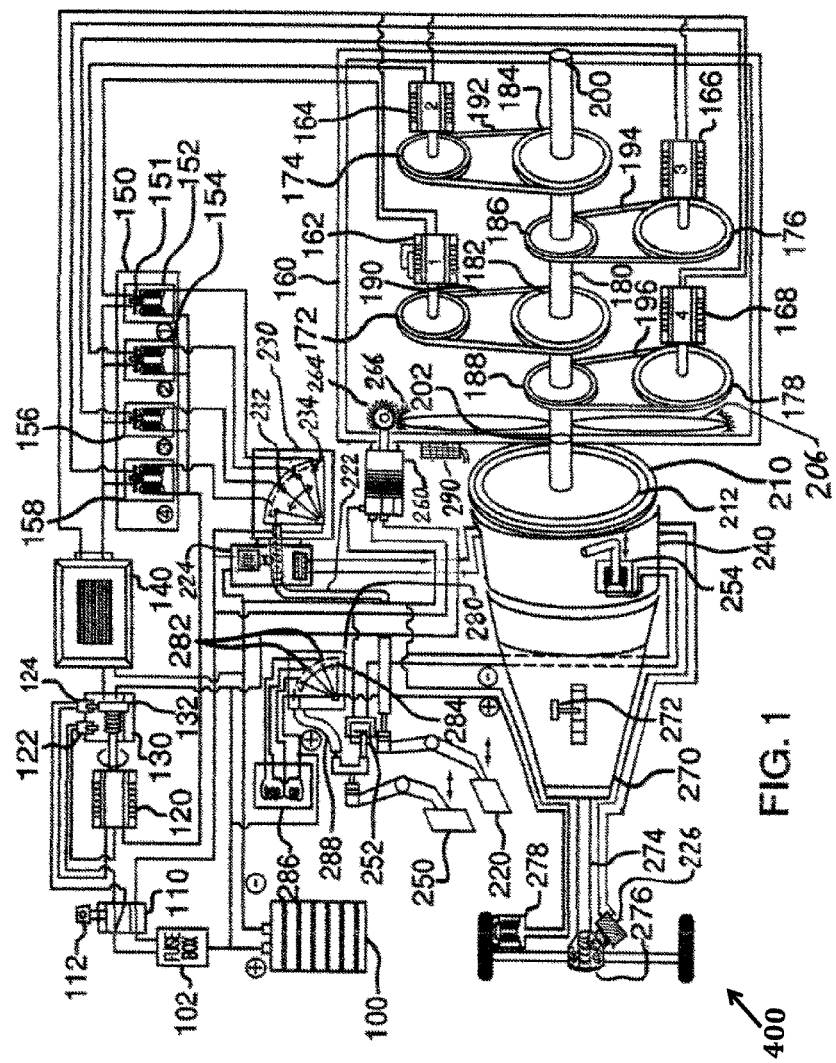
FIG. 1 shows a schematic view of the present invention.
Figure 5:
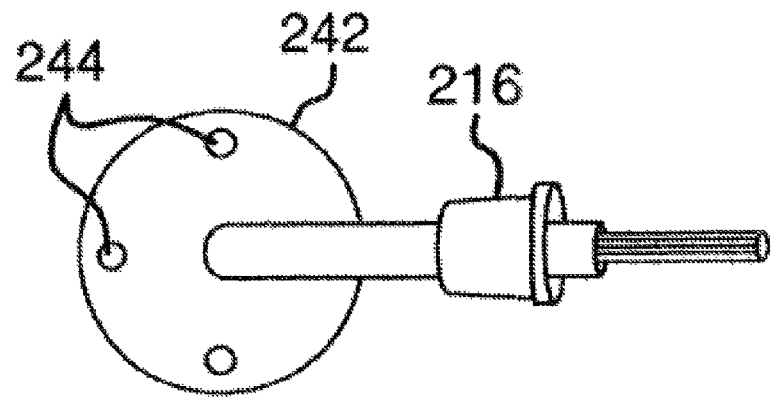
FIG. 5 shows a perspective view of the automatic transmission adapter of the present invention.
Figure 6:
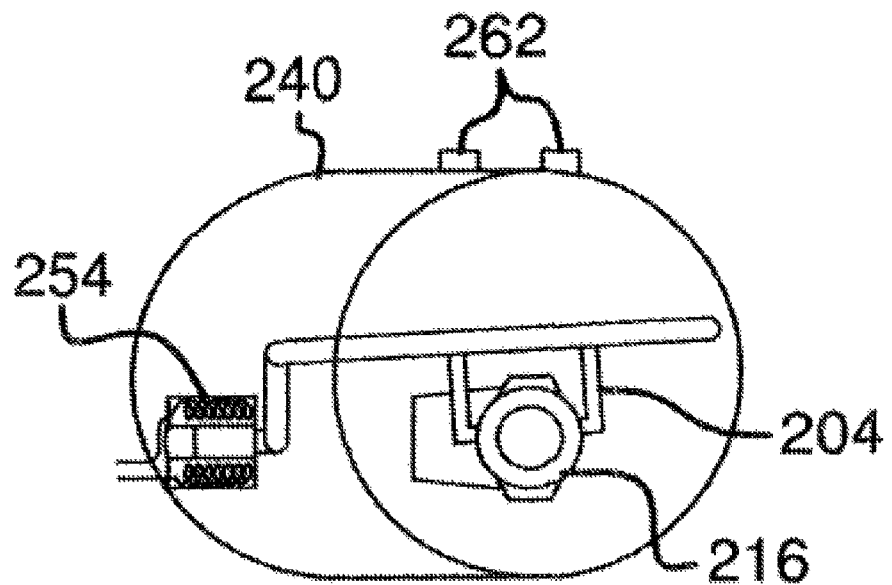
FIG. 6 shows a front view of the automatic transmission clutch adapter housing of the present invention.
Figure 7:
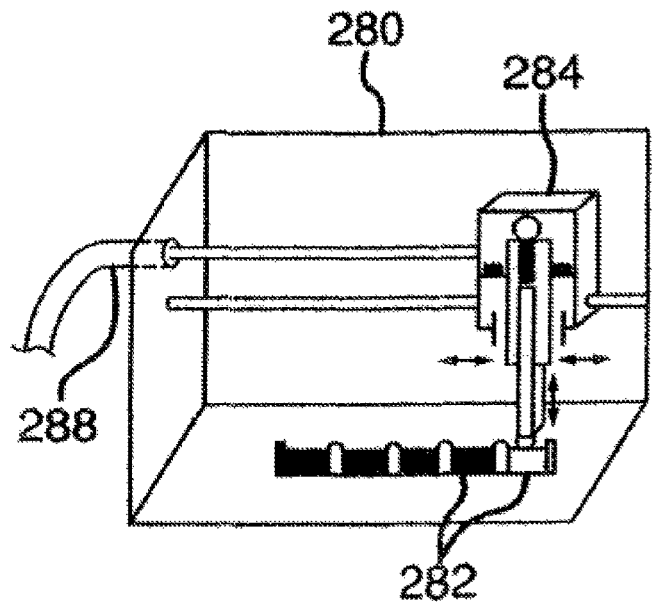
FIG. 7 shows a perspective view of the electric brake command box with the interfacing stock-free brake command box lever of the present invention.

Following is a list of elements corresponding to a particular element referred to herein:
100 Battery
102 Fuse box
110 System switch
112 System switch key
132 Inverter switch box contact disc
140 Inverter
150 Solenoids box
151 Solenoid contact disc
152 Solenoid number one
154 Solenoid number two
156 Solenoid number three
158 Solenoid number four
160 Electric motor system
162 Electric motor number one
164 Electric motor number two
166 Electric motor number three
168 Electric motor number four
172 Motor sprocket number one
174 Motor sprocket number two
176 Motor sprocket number three
178 Motor sprocket number four
180 Main system shaft
182 Shaft sprocket number one
184 Shaft sprocket number two
186 Shaft sprocket number three
188 Shaft sprocket number four
190 Chain number one
192 Chain number two
194 Chain number three
196 Chain number four
200 Front bearing
202 Back bearing
204 Pressure plate bearing mount
206 System fan
210 Metal disc plate
212 Pressure plate
214 Pressure plate disc
216 Pressure plate bearing
218 Metal disc plate bearing
220 Accelerator pedal
222 Accelerator pedal cable
224 Accelerator command controller box
226 Vehicle speed sensor
230 Accelerator command box
232-1 Accelerator command box contact plate 1
232-2 Accelerator command box contact plate 2
232-3 Accelerator command box contact plate 3
232-4 Accelerator command box contact plate 4
234 Accelerator command box lever
240 Automatic transmission adapter housing
242 Automatic transmission adapter
244 Automatic transmission adapter mounting hole
250 Brake and clutch pedal
252 Solenoid clutch switch
254 Solenoid clutch command
260 Alternator
262 Alternator mount
264 Alternator gear
266 Fan-gear 270 Automatic transmission
272 Automatic transmission lever
274 Drive shaft
276 Axle
278 Electric brake caliper
280 Electric brake command box
282 Brake command box contact plate
284 Brake command box lever
286 Brake resistance box
288 Brake cable
290 Heat collector
300 Hydraulic brake and clutch pedal
310 Hydraulic clutch adjustment rod
312 Clutch master cylinder
314 Clutch pipe line
316 Clutch slave cylinder
320 Hydraulic brake adjustment rod
322 Brake master cylinder
324 Brake pipe line
326 Hydraulic brake caliper
330 Electric air vacuum
400 Chassis The present invention features an electric engine system having a novel idling capability. In reference to FIG. 1, a present embodiment of the system includes an electric motor system box (160) housing a first electric motor (162), a second electric motor (164), a third electric motor (166) and a fourth electric motor (168). Coupled to the plurality of motors are a plurality of sprockets where, a first motor sprocket (172) is operatively connected to the first electric motor (162), a second motor sprocket (174) is operatively connected to the second electric motor (164), a third motor sprocket (176) is operatively connected to the third electric motor (166), and a fourth motor sprocket (178) is operatively connected to the fourth electric motor (168).

The system further comprises a main system shaft (180) driven by a single electric motor, of the plurality of aforementioned motors, via the electric motor sprockets, shaft sprockets and loop belts; wherein a first shaft sprocket (182), a second shaft sprocket (184), a third shaft sprocket (186), and a fourth shaft sprocket (188) are each axially disposed on the main system shaft (180) as depicted in FIG. 1. Loop belts mechanically couple individual electric motor sprockets to corresponding shaft sprockets. For example, the first motor sprocket (172) operatively connects to the first shaft sprocket (182) via a first loop belt (190), the second motor sprocket (174) operatively connects to the second shaft sprocket (184) via a second loop belt (192), the third motor sprocket (176) operatively connects to the third shaft sprocket (186) via a third loop belt (194), and the fourth motor sprocket (178) operatively connects to the fourth shaft sprocket (188) via a fourth loop belt (196).

As mentioned earlier, each motor drives its corresponding motor sprocket and shaft sprocket and in turn, the corresponding motor sprocket and shaft sprocket drives the rotational speed of the main system shaft (180). Ray sizes of the motor sprockets and shaft sprockets are pre-selected to adjust the applied force, from a particular motor, to the main system shaft (180). In a preferred embodiment, the ray size of the first motor sprocket (172) is smaller than the ray size of the second motor sprocket (174), the ray size of the second motor (174) sprocket is smaller than the ray size of the third motor sprocket (176), and the ray size of the third motor sprocket (176) is smaller than the ray size of the fourth motor sprocket (178). Shaft sprocket sizes are chosen in a similar manner, for example, the ray size of the first shaft sprocket (182) is bigger than the ray size of the second shaft sprocket (184), the ray size of the second shaft sprocket (184) is bigger than the ray size of the third shaft sprocket (186), and the ray size of the third shaft sprocket (186) is bigger than the ray size of the fourth shaft sprocket (188).

As will be subsequently detailed, the access each motor has to the main system shaft (180) must be determined in an ordered fashion. In the present invention, solenoids are employed to open and close the circuit associated with each of the plurality of motors (thereby effectively shutting the motors off and on, respectively). For example, a first solenoid (152) is operatively connected to the first electric motor (162), a second solenoid (154) is operatively connected to the second electric motor (164), a third solenoid (156) is operatively connected to the third electric motor (166), and a fourth solenoid (158) is operatively connected to the fourth electric motor (168).

An accelerator pedal (220) operatively connected to an accelerator pedal cable (222) may also be included in the present invention. The accelerator pedal (220) comprises four depression depths. A first depression depth is the idling mode when zero force or no force is applied against the accelerator pedal (220), a second depression depth is reached when a first force is applied against the accelerator pedal (220), a second depression depth is reached when a third force is applied against the accelerator pedal (220), and a fourth depression depth is reached when a third force is applied against the acceleration pedal (220). The magnitude of each force may differ. As an example, the first force is zero Newton, the second force is larger than the first force, the third force is larger than the second force, and the fourth force is larger than the third force.

Figure 8:
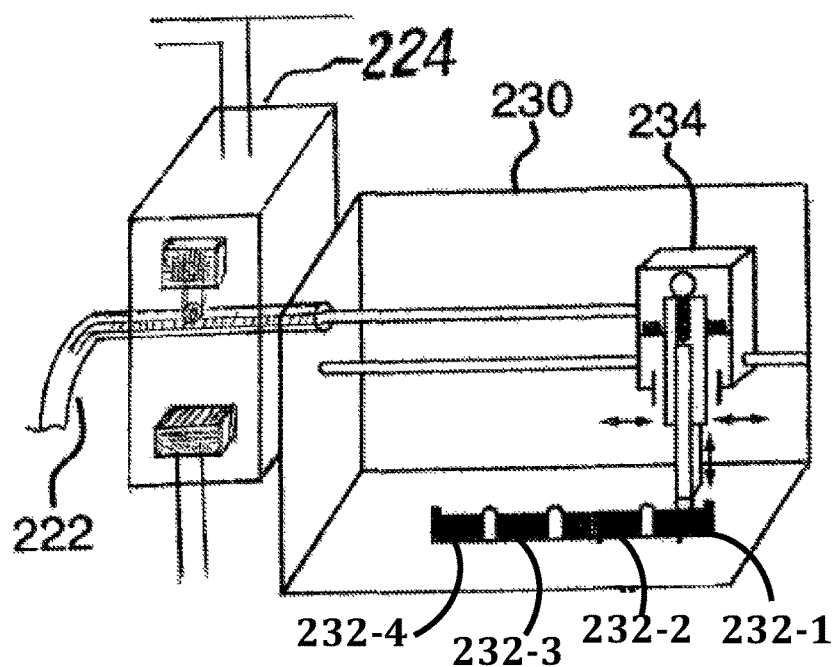
FIG. 8 shows a perspective view of the accelerator command controller box and the accelerator command box with the interfacing stock-free brake command box lever of the present invention.
Figure 9:
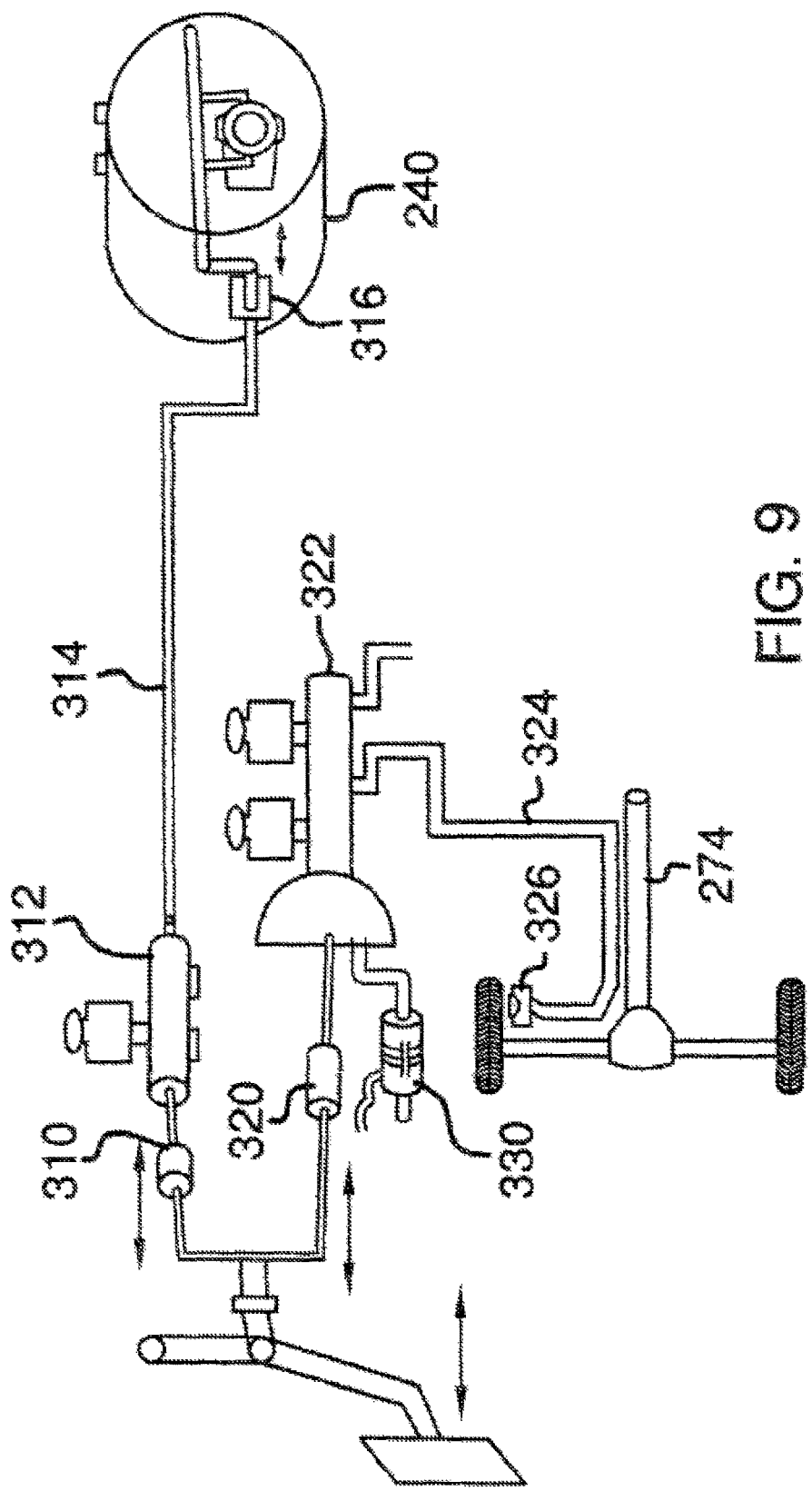
FIG. 9 shows a schematic view of an alternate embodiment of the brake system of the present invention.

Further, as depicted in FIG. 8, an accelerator command box (230) housing an accelerator command box lever (234), a first accelerator command box contact plate (232-1), a second accelerator command box contact plate (232-2), a third accelerator command box contact plate (232-3), and a fourth accelerator command box contact plate (232-4) may be included in preferred embodiments where the accelerator command box lever (234) is operatively connected to the accelerator pedal (220) via the accelerator pedal cable (222). The first accelerator command box contact plate (232-1) is operatively connected to the first solenoid (152), the second accelerator command box contact plate (232-2) is operatively connected to the second solenoid (154), the third accelerator command box contact plate (232-3) is operatively connected to the third solenoid (156), and the fourth accelerator command box contact plate (232-4) is operatively connected to the fourth solenoid (158).

Consistent with disclosed embodiments, upon activation of the system switch key (112) to a second position and the accelerator command box lever (234) interfacing the accelerator command box contact plate (232-1) in idling position, this causes the first solenoid (152) to close the circuit of the first electric motor (162), activating the first electric motor (162) to operate at maximum speed. This speed drives the first motor sprocket (172) and the first shaft sprocket (182). These sprockets, by virtue of their pre-determined ray size, adjust the applied motor speed to the main system shaft (180) causing the main system shaft (180) to rotate at an idle speed for example, 1000 rpm.

Similarly, when the first force is applied to the accelerator pedal (220) a proportional force is applied to the accelerator pedal cable (222), moving the accelerator command box lever (234) from the first accelerator command box contact plate (232-1) to the second accelerator command box contact plate (232-2). This activates the first solenoid (152) to open the circuit of the first electric motor (162), thereby shutting it off, and activates the second solenoid (154) to close the circuit of the second electric motor (164), thereby causing the second electric motor (164) to run at maximum speed. The second electric motor (164) drives the second motor sprocket (174) and the second shaft sprocket (184). The second motor sprocket (174) and the second shaft sprocket (184) operate to rotate the system shaft (180) at a second speed level where the magnitude of the second speed level is greater than the magnitude of the idle speed.

Further, when the second force is applied to the accelerator pedal (220), a proportional force is applied to the accelerator pedal cable (222) moving the accelerator command box lever (234) from the second accelerator command box contact plate (232-2) to the third accelerator command box contact plate (232-3). This activates the second solenoid (154) to open the circuit of the second electric motor (164), thereby shutting it off, and activates the third solenoid (156) to close the circuit of the third electric motor (166), thereby causing the third electric motor (166) to run at maximum speed. The third electric motor (166) drives the third motor sprocket (176) and the third shaft sprocket (186), where the third motor sprocket (176) and the third shaft sprocket (186) operate to rotate the system shaft (180) at a third speed level. The magnitude of the third speed level is greater than the magnitude of the second speed level.

Finally, at the application of the third force to the accelerator pedal (220), a proportional force is applied to the accelerator pedal cable (222). This moves the accelerator command box lever (234) from the third accelerator command box contact plate (232-3) to the fourth accelerator command box contact plate (232-4), activating the third solenoid (156) to open the circuit of the third electric motor (166) (shutting it off). The fourth solenoid (158) is also activated to close the circuit of the fourth electric motor (168). This causes the fourth electric motor (168) to run at maximum speed, which drives the fourth motor sprocket (178) and the fourth shaft sprocket (188). The fourth motor sprocket (178) and the fourth shaft sprocket (188) operate to rotate the main system shaft (180) at a fourth speed level, where the magnitude of the fourth speed level is greater than the magnitude of the third speed level.

In an embodiment of the present system, the accelerator command controller box (224) is connected to a battery (100) via a fuse box (102) and system switch (110). The accelerator command controller box (224) is activated when the vehicle is in motion and the accelerator pedal (220) is released. During vehicle slowdown or braking, the accelerator command controller box (224) matches a pre-selected vehicle speed level to the corresponding electric motor in the electric motor system (160) via the vehicle speed sensor (226) progressively decreasing the electric motor system rotation speed to the idling speed. For example, as the vehicle slows down from the forth speed level to the third speed level, the accelerator command controller box (224) releases the accelerator command box lever (234) from the forth accelerator command box contact plate (232-4) onto the third accelerator command box contact plate (232-3) connected to the third solenoid (156). The fourth solenoid (158) opens the circuit of the fourth electric motor (168) and the third solenoid (156) closes the circuit of the third electric motor (166) activating it. The third electric motor (166), operating at maximum speed, decreases the electric motor system (160) speed from the forth speed level to the third speed level.

As the vehicle further slow downs from the third speed level to the second speed level, the accelerator command controller box (224) releases the accelerator command box lever (234) from the third accelerator command box contact plate (232-3) onto the second accelerator command box contact plate (232-2) connected to the second solenoid (154). The third solenoid (156) opens the circuit of the third electric motor (166) and the second solenoid (154) closes the circuit of the second electric motor (164) activating it. The second electric motor (164), operating at maximum speed, decreases the speed of the electric motor system (160) from the third speed level to the second speed level.

Finally, as the vehicle slows down from the second speed level to the first speed level, the accelerator command controller box (224) releases the accelerator command box lever (234) from the second accelerator command box contact plate (232-2) onto the first accelerator command box contact plate (232-1) connected to the first solenoid (152). The second solenoid (154) opens the circuit of the second electric motor (164) and the first solenoid (152) closes the circuit of the first electric motor (162) activating it. The first electric motor (162), operating at maximum speed, decreases the electric motor system (160) speed from the second speed level to the first or idling speed level.

The system may further comprise an alternator (260) located on the rear top corner of the electric motor system (160) via an alternator mount (262). The alternator (260) is mechanically connected to a fan-gear (266) via an alternator gear (264) engaging the fan-gear (266) for rotatingly powering the alternator (260). The alternator (260) is electrically connected to the battery (100) and activated by the system switch (110).

In the present invention, when the electric motor (160) system is running, the alternator (260), via the system shaft (180) and the fan-gear (266), is running at a speed sufficient to recharge the battery (100). The output current of the alternator (260) is continuous and the output frequency increases as the rotational speed of the motor system (160) increases.

The featured electric engine has a demonstrated capacity between idle speed (1000 rpm) and high speed (6000+ rpm) to continuously produce an exponentially high electric power.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiments of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. An electric engine system having an idling capability, the system comprising:
    (a) a first electric motor (162), a second electric motor (164), a third electric motor (166) and a fourth electric motor (168);
    (b) a first motor sprocket (172) operatively connected to the first electric motor (162), a second motor sprocket (174) operatively connected to the second electric motor (164), a third motor sprocket (176) operatively connected to the third electric motor (166), and a fourth motor sprocket (178) operatively connected to the fourth electric motor (168);
    (c) a main system shaft (180), wherein a first shaft sprocket (182) is axially disposed on the main system shaft (180), a second shaft sprocket (184) is axially disposed on the main system shaft (180), a third shaft sprocket (186) is axially disposed on the main system shaft (180), and a fourth shaft sprocket (188) is axially disposed on the main system shaft (180);
        wherein the first motor sprocket (172) operatively connects to the first shaft sprocket (182) via a first loop belt (190), the second motor sprocket (174) operatively connects to the second shaft sprocket (184) via a second loop belt (192), the third motor sprocket (176) operatively connects to the third shaft sprocket (186) via a third loop belt (194), and the fourth motor sprocket (178) operatively connects to the fourth shaft sprocket (188) via a fourth loop belt (196);
        wherein the ray size of the first motor sprocket (172) is smaller than the ray size of the second motor sprocket (174) where the ray size of the second motor (174) sprocket is smaller than the ray size of the third motor sprocket (176) where the ray size of the third motor sprocket (176) is smaller than the ray size of the fourth motor sprocket (178), wherein the ray size of the first shaft sprocket (182) is bigger than the ray size of the second shaft sprocket (184), where the ray size of the second shaft sprocket (184) is bigger than the ray size of the third shaft sprocket (186), where the ray size of the third shaft sprocket (186) is bigger than the ray size of the fourth shaft sprocket (188);
    (d) a first solenoid (152) operatively connected to the first electric motor (162), a second solenoid (154) operatively connected to the second electric motor (164), a third solenoid (156) operatively connected to the third electric motor (166), and a fourth solenoid (158) operatively connected to the fourth electric motor (168);
    (e) an accelerator pedal (220) operatively connected to an accelerator pedal cable (222), wherein the accelerator pedal (220) comprises four depression depths, where a first depression depth is idling mode and reached when a force of zero Newton is applied against the accelerator pedal (220), a second depression depth is reached when a first force is applied against the accelerator pedal (220), a third depression depth is reached when a second force is applied against the accelerator pedal (220), and a fourth depression depth is reached when a third force is applied against the accelerator pedal (220),
        wherein the first force is larger than zero Newton, the second force is larger than the first force, and the third force is larger than the second force;
    (f) a system switch key (112) electrically connected to a battery (100) via a fuse box (102) having a first position and a second position, wherein the first position of the system switch key (112) maintains the system in an OFF mode and the second position of the system switch key (112) activates the system;
    (g) an accelerator command box (230) housing an accelerator command box lever (234), a first accelerator command box contact plate (232-1), a second accelerator command box contact plate (232-2), a third accelerator command box contact plate (232-3), and a fourth accelerator command box contact plate (232-4),
        wherein the accelerator command box lever (234) is operatively connected to the accelerator pedal (220) via the accelerator pedal cable (222),
        wherein the first accelerator command box contact plate (232-1) is operatively connected to the first solenoid (152), the second accelerator command box contact plate (232-2) is operatively connected to the second solenoid (154), the third accelerator command box contact plate (232-3) is operatively connected to the third solenoid (156), and the fourth accelerator command box contact plate (232-4) is operatively connected to the fourth solenoid (158),
        wherein upon activation of the system switch key (112) to a second position and wherein the accelerator command box lever (234) is in contact with the first accelerator command box contact plate (232-1), at the application of zero force to the accelerator pedal (220), the first solenoid (152) is activated to close the circuit of the first electric motor (162) causing the first electric motor (162) to operate at maximum speed wherein the first electric motor (162) drives the first motor sprocket (172) and the first shaft sprocket (172) where the first motor sprocket (172) and the first shaft sprocket (182), as a result of pre-determined ray sizes, operate to rotate the main system shaft (180) at an idle speed,
        wherein when the first force is applied to the accelerator pedal (220) a proportional force is applied to the accelerator pedal cable (222) moving the accelerator command box lever (234) from the first accelerator command box contact plate (232-1) to the second accelerator command box contact plate (232-2) activating the first solenoid (152) to open the circuit of the first electric motor (162), thereby shutting it off, and activating the second solenoid (154) to close the circuit of the second electric motor (164) causing the second electric motor (164) to run at maximum speed wherein the second electric motor (164) drives the second motor sprocket (174) and the second shaft sprocket (184) where the second motor sprocket (174) and the second shaft sprocket (184), as a result of pre-determined ray sizes, operate to rotate the main system shaft (180) at a second speed level where the magnitude of the second speed level is greater than the magnitude of the idle speed,
        wherein when the second force is applied to the accelerator pedal (220) a proportional force is applied to the accelerator pedal cable (222) moving the accelerator command box lever (234) from the second accelerator command box contact plate (232-2) to the third accelerator command box contact plate (232-3) activating the second solenoid (154) to open the circuit of the second electric motor (164), thereby shutting it off, and activating the third solenoid (156) to close the circuit of the third electric motor (166), causing the third electric motor (166) to run at maximum speed, wherein the third electric motor (166) drives the third motor sprocket (176) and the third shaft sprocket (186) where the third motor sprocket (176) and the third shaft sprocket, as a result of pre-determined ray sizes, (186) operate to rotate the main system shaft (180) at a third speed level where the magnitude of the third speed level is greater than the magnitude of the second speed level, wherein when the third force is applied to the accelerator pedal (220) a proportional force is applied to the accelerator pedal cable (222) moving the accelerator command box lever (234) from the third accelerator command box contact plate (232-3) to the fourth accelerator command box contact plate (232-4) activating the third solenoid (156) to open the circuit of the third electric motor (166), thereby shutting it off, and activating the fourth solenoid (158) to close the circuit of the fourth electric motor (168), activating the fourth electric motor (168) to run at maximum speed, wherein the fourth electric motor (168) drives the fourth motor sprocket (178) and the fourth shaft sprocket (188) where the fourth motor sprocket (178) and the fourth shaft sprocket (188), as a result of pre-determined ray sizes, operate to rotate the main system shaft (180) at a fourth speed level where the magnitude of the fourth speed level is greater than the magnitude of the third speed level;

(h) an accelerator command controller box (224) operatively connected to the battery (100) via the fuse box (102) and a system switch (110), wherein as the vehicle slow downs from the forth speed level to the third speed level, the accelerator command controller box (224) releases the accelerator command box lever (234) from the forth accelerator command box contact plate (232-4) to the third accelerator command box contact plate (232-3) connected to the third solenoid (156) wherein the fourth solenoid (158) opens the circuit of the fourth electric motor (168) and the third solenoid (156) closes the circuit of the third electric motor (166) activating it, wherein the third electric motor (166), operating at maximum speed, decreases the electric motor system (160) speed from the forth speed level to the third speed level, wherein as the vehicle further slows down from the third speed level to the second speed level, the accelerator command controller box (224) releases the accelerator command box lever (234) from the third accelerator command box contact plate (232-3) onto the second accelerator command box contact plate (232-2) connected to the second solenoid (154) wherein the third solenoid (156) opens the circuit of the third electric motor (166) and the second solenoid (154) closes the circuit of the second electric motor (164) activating it wherein the second electric motor (164), operating at maximum speed, decreases the speed of the electric motor system (160) from the third speed level to the second speed level, wherein, as the vehicle slows down from the second speed level to the first speed level, the accelerator command controller box (224) releases the accelerator command box lever (234) from the second accelerator command box contact plate (232-2) onto the first accelerator command box contact plate (232-1) connected to the first solenoid (152), where the second solenoid (154) opens the circuit of the second electric motor (164) and the first solenoid (152) closes the circuit of the first electric motor (162) activating it, wherein the first electric motor (162), operating at maximum speed, decreases the electric motor system (160) speed from the second speed level to the first or idling speed level;

(i) an alternator (260) located on the rear top corner of the electric motor system (160) via an alternator mount (262), where the alternator (260) is mechanically connected to a fan-gear (266) via an alternator gear (264) engaging the fan-gear (266) for rotatingly powering the alternator (260), where the alternator (260) is electrically connected to the battery (100) and activated by the system switch (110);

wherein when the electric motor (160) system is running, the alternator (260), via the system shaft (180) and the fan-gear (266), is running at a speed sufficient to recharge the battery (100) where an output current of the alternator (260) is continuous and an output frequency increases as rotational speed of the motor system (160) increases.

2. The system of claim 1, wherein an electric vehicle houses the electric engine system wherein the electric vehicle has a demonstrated capacity between idle speed (1000 rpm) and high speed (6000+ rpm) to continuously produce an exponentially high electric power while using a constant electric current.

* * * * *